Jan. 19, 1943.  J. HARRINGTON  2,308,508
HAY DRIER
Filed Feb. 23, 1940  5 Sheets-Sheet 2

INVENTOR.
Joseph Harrington
By: Cox & Moore
ATTORNEYS.

Jan. 19, 1943.  J. HARRINGTON  2,308,508
HAY DRIER
Filed Feb. 23, 1940  5 Sheets-Sheet 3

INVENTOR.
Joseph Harrington
BY: Cox & Moore
ATTORNEYS.

Jan. 19, 1943.　　　J. HARRINGTON　　　2,308,508
HAY DRIER
Filed Feb. 23, 1940　　　5 Sheets-Sheet 4

INVENTOR.
BY: Joseph Harrington
Cox & Moore
ATTORNEYS

Jan. 19, 1943.  J. HARRINGTON  2,308,508
HAY DRIER
Filed Feb. 23, 1940   5 Sheets-Sheet 5

INVENTOR.
Joseph Harrington
BY: Cox & Moore
ATTORNEYS

Patented Jan. 19, 1943

2,308,508

UNITED STATES PATENT OFFICE 2,308,508

HAY DRIER

Joseph Harrington, Riverside, Ill.

Application February 23, 1940, Serial No. 320,273

12 Claims. (Cl. 99—235)

This invention relates to driers for dehydrating green fodder, such as alfalfa, hay, grass, and the like, whereby to preserve the carotin and vitamin qualities and the palatability and appearance of the green fodder, such as grass, alfalfa, and the like, while at the same time depriving them of their moisture so that they will not be spontaneously heated or deteriorate from the heating process and so that they will keep and can be stored in loose form, baled or bagged without danger of deterioration or combustion.

Among the objects of the present invention are to provide a cheap, portable type of dehydrator which will function economically to dehydrate freshly mown grasses, alfalfa or other organic materials, such as hay, timothy, clover, or other plant life of the same nature, in order to preserve the natural color and food properties thereof so that such material may be suitably stored for live stock or other feed; to provide an improved method and apparatus for dehydrating plant material of the foregoing character wherein the material to be treated is subjected to temperatures best suited to the condition of the material at a particular point in the drying process, whereby to avoid the danger of scorching or burning the plant material during the evaporation of the moisture content thereof; to provide an improved method and apparatus for quickly and efficiently dehydrating plant material of the foregoing character which will effectively remove the desired amount of moisture while at the same time retaining the feed qualities of the material in substantially the same proportion as existed when freshly cut; to provide a process and apparatus wherein the freshly cut plant material is subjected to a succession of heat zones wherein each zone is supplied with low humidity air or other fluid medium which is heated to the desired degree of temperature, to attain the maximum evaporative effect for that particular stage; to provide a dehydrating method and apparatus wherein the plant material being dehydrated is subjected to a single passage through the machine to accomplish the necessary dehydration in a minimum of time and at the minimum expense; to provide a process and apparatus for dehydrating plant material of the foregoing nature wherein the speed and time of drying may be widely varied and wherein the temperatures of the medium used for drying may be widely varied, whereby different types of grasses or other plant material may be suitably processed; to provide a process and apparatus of the foregoing character which will embody quick and efficient drying capacity and low cost, to economic success; to provide a process and apparatus for dehydrating plant materials wherein there is incorporated in the dehydrator means for crushing the stems or thick parts of the organic material being dried without affecting the action of feeding the material to the dehydrator and wherein the material passes through the dehydrator and is discharged therefrom in a single, continuous, speedy operation; to provide in the foregoing type of apparatus means for separating and removing the finer or lighter portions so that it is not necessary to feed them through the crushing rolls, whereby more effective crushing of the thicker portions is effected; to provide a dehydrator wherein the organic material is fed into the feed opening of the hopper of the device and thereafter is automatically fed into a drying chamber wherein the drying is carried out partly in oxygen-free atmosphere, while at the same time the material is progressively fed to and dried in a single passage through the machine in a manner to exclude atmospheric air therefrom during the initial stages, and thereby to produce a drying chamber practically devoid of free oxygen and wherein all products of combustion are completely burned without smoke so as to produce an efficient drying of the organic material without burning, scorching or in any other way affecting the palatability, appearance or value of the material as a feed for stock or for human consumption; and to provide these and other objects of invention as will be apparent from a perusal of the following specification when taken in connection with the accompanying drawings, wherein:

Figure 4:
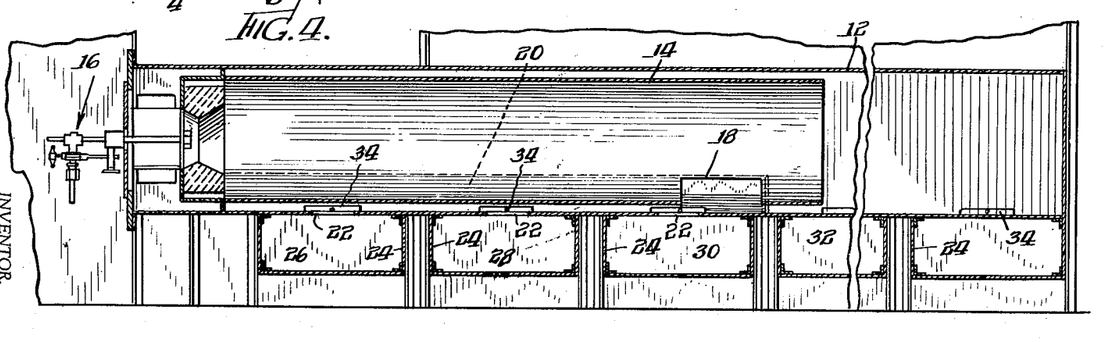
Figure 4 is a fragmentary sectional view taken on the line 4—4 of Figure 5.
Figures 5, 6, 7:
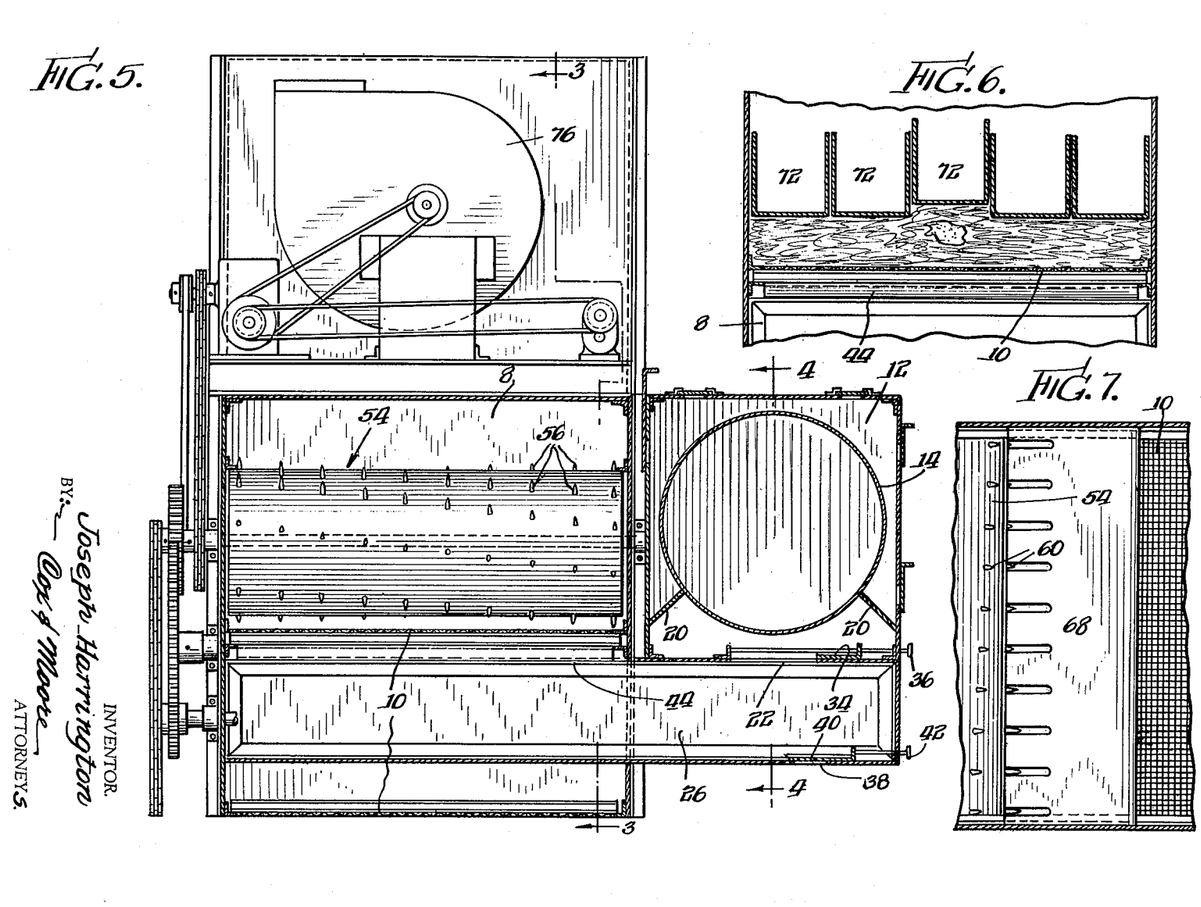
Figure 5 is a vertical cross sectional view taken on the line 5—5 of Figure 3.
Figure 6 is a fragmentary detail sectional view taken on the line 6—6 of Figure 3.
Figure 7 is a fragmentary detail plan sectional view taken on the line 7—7 of Figure 3.

Referring now to the drawings in detail, the device is shown as preferably of portable construction, although it may be constructed to be stationary. The device in its portable form comprises a plurality of longitudinal and transverse frame members forming a suitable, rigid, elongated support of any desired construction adapted to be mounted on wheels 2. In case it is not desired to mount the device on wheels, it may be mounted on suitable upright supports. Inasmuch as the construction of the framework for supporting the machine proper is not of any particular importance, any desired arrangement of longitudinal beams and cross beams may be utilized. In general, the drier consists of an endless belt suitably mounted on the frame to pass over driving pulley 4 and an idle and tightening pulley 6 suitably mounted for rotation on the front and rear ends of the elongated frame, which frame is provided with suitable wall members or sides whereby suitably to enclose the endless belt and other portions of the frame to provide an elongated box-like structure, preferably of rectangular cross sectional configuration. As shown in Figure 5, there is a main box-like structure 8 extending the length of the conveyor, which box 8 forms an air-tight housing for the upper and lower reaches of a conveyor screen 10. In addition, alongside and parallel to the box-like structure 8 there is another box-like structure or chamber 12 in which is disposed heating means, shown specifically in Figure 4 as a heat-resistant, metallic tube 14. This tube is of considerable length and is provided at one end with any type of commercial oil burner 16 and at the other end with suitable discharge openings 18, whereby the heated products of combustion generated by the oil burner 16 may be discharged. The interior of the compartment or chamber 12 is provided with suitable baffles 20, communicating with outlets 22 and a third cross chamber, for directing the heated products of combustion to the desired discharge outlets 22. There are a number of these cross chambers formed by the baffles 24 into cross chambers 26, 28, 30 and 32, there being substantially eight of them, coextensive with the length of the device. Each one of the outlets 22, is adapted to be controlled by a door or damper 34 adjustably controlled by means of a handle 36, and, in addition, each one of the chambers 26, 28, 30 and 32 is provided with an air intake opening 38, in turn controlled by a door 40 having an adjustable control rod 42. It will be understood that the hot products of combustion discharged from the cylinder 14 will pass into the main chamber 12 and thence will pass by the separate outlets 22 to any one of the plurality of hot air discharge chambers 26, 28, 30 and 32, and that by reason of the adjustment of the doors 22 the amount of hot gases entering any one of these chambers may be controlled.

The upper walls of each of the chambers 26, 28, 30 and 32 are provided with automatic sealing devices 44 and 46, which permit the flexible belt to pass across each of said chambers to form therewith a sealing connection which will prevent the contents of one chamber from being discharged into another chamber. It will thus be understood that the drier consists of an endless belt which carries the organic material, such as grasses, from a point of admission of a hopper 48 at the entering end to a point of discharge 50 at the opposite end, and over and across the series of compartments 26, 28, 30 and 32, into which the hot products of combustion are drawn at desired temperature and volume. These hot products of combustion pass up through the openings in the endless belt and through the layer of material on the belt, whereupon the latter is dried in a most expeditious manner. That is, green hay or other material thrown into the hopper in large masses or bundles by means of a fork or other instrument is laid on the belt in a reasonably uniform layer so that it may be uniformly dried. This feeding of the material onto the belt is accomplished by means of two feed wheels 52 and 54 disposed in an associated manner with the entry end of the endless belt. The wheel 52 is equipped with a series of teeth slanting forward and rotating counterclockwise. These teeth, which are preferably two inches long, will seize a layer of grass from the hopper 48 and carry it forward, the layer of grass being just equal to the length of the teeth and no more. This layer of grass will be carried by teeth 56 through a passageway 58 to a point where the grass will be seized by teeth 60 on the stripping roll 54. The peripheral speed of the stripping roll 54 is approximately twice as fast as that of the stripping roll 52, so that the teeth 60 on the stripping roll 54 will take away from the teeth 56 the layer of grass carried thereby. A housing 64 is provided with clearance slots for the teeth 56 on the feed roll 52 to prevent the layer of grass from being carried back into the hopper to the point of transfer of the grass from the teeth 56 to the teeth 60. Hence, this grass will be carried clockwise to a discharge point 66, where an apron or sheet 68 lies against the body of the roll. The teeth 60 on the stripping roll 54 are slanted backwards so that the material will be able to slide off the end of these teeth. The layer of discharged grass will then slide down the apron 68 onto the travelling belt 10 and proceed in the direction of the arrow to the discharge end. The first one or two zones 26 and 28 are provided with high temperature combustion fluid because the wet material at that point will not thereby be injured, but as soon as the drying has progressed the temperature of the combustion fluid is reduced.

Figure 1:
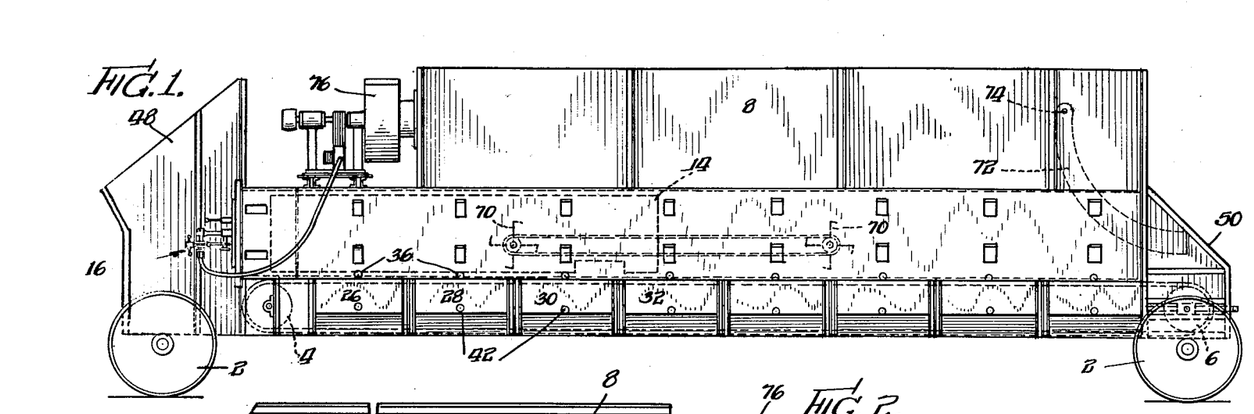
Figure 1 is a side elevational view of one form of my apparatus.
Figure 2:
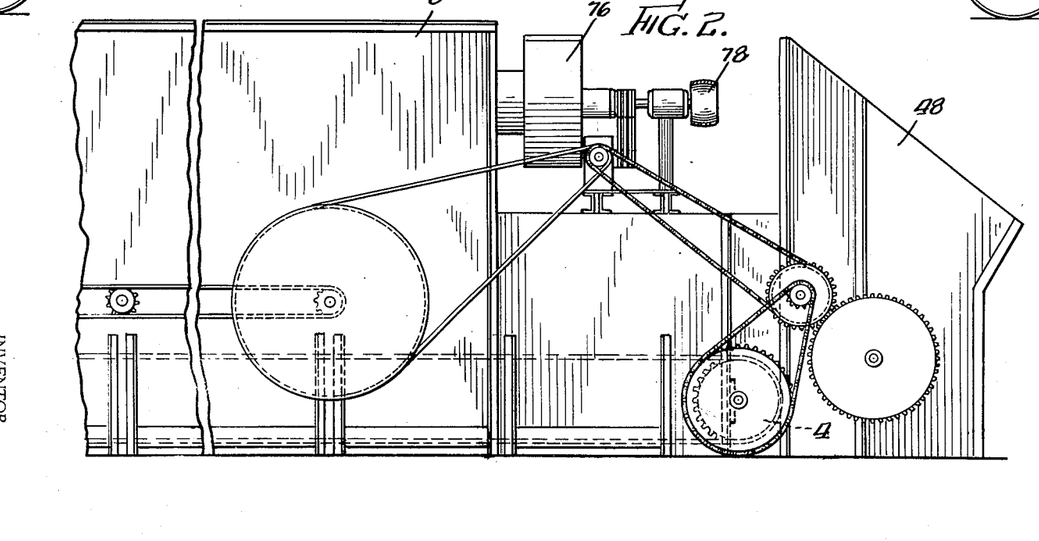
Figure 2 is a view of the forward or feed end of the device showing the opposite side of that shown in Figure 1.
Figure 3:
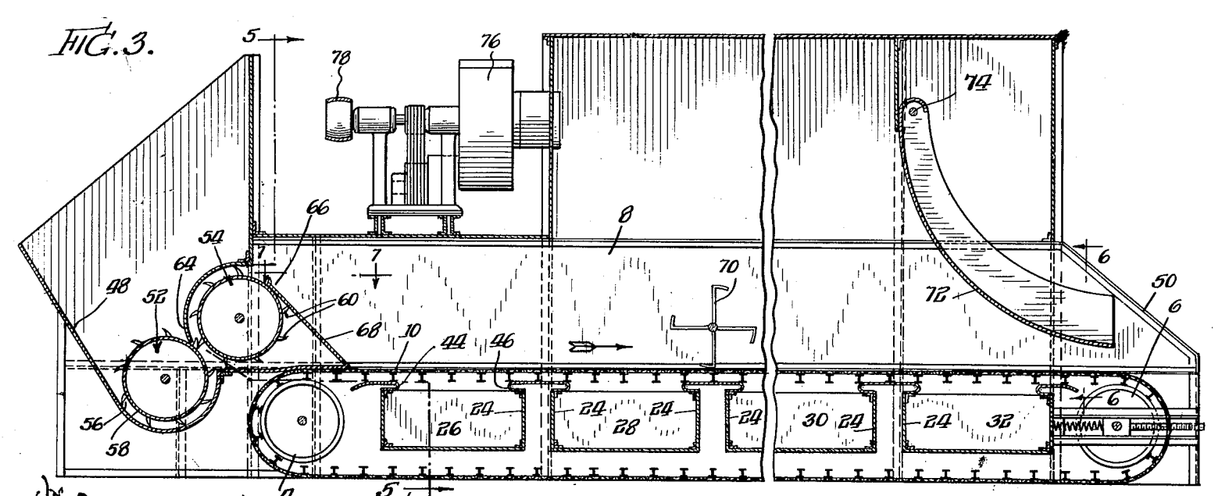
Figure 3 is a longitudinal section taken on the line 3—3 of Figure 5 with the central portion broken away.

At two points of travel in the drying there is a tedder 70 which picks up the layer of drying material, turns it upside down and deposits it loosely on the travelling conveyor. In this way, the material is kept loose and there is no danger of over-drying the lower part of the layer. When drying has been completed, the dried material passes under a swinging or riding seal 72 pivoted to the top of the structure, as at 74, and built up of various sections, so that should there be a lump or hump in the dried material, the section will ride over it without lifting the entire seal. In this way, an inrush of cold air is prevented. The dried material is discharged at the right-hand end of the conveyor, as shown in Figure 3.

The fluid products of combustion are caused to enter the various compartments 26, 28, 30 and 32, by virtue of an induced draft fan 76, which is run by a tractor the belt of which engages a pulley 78. All of the moisture and drying fluid arising from the drying process is extracted by the fan 76 and discharged to the atmosphere. This fan has an extended shaft permitting the placement of the pulley 78 thereon, which, in turn, is adapted to carry a belt to operate the pulley. This pulley constitutes the input end of a speed reducer. The low speed shaft of the speed reducer carries one or more pulleys from which the various rolls and parts are operated.

Heat is produced by burning fuel, oil or coal in a combustion chamber 12. The drawings show an application for fuel oil, being the simplest one, although not the cheapest for this purpose. The oil burner and combustion tube are of standard construction.

It is well known that by drying the fodder crops in the open air the oxidation of certain elements results, which reduces the vitamin value materially. The drying of fodder crops by artificial heat, wherein the oxygen is wholly or largely eliminated from the drying gases prevents the loss of these valuable food constituents and renders the product more nourishing and palatable. I therefore use the undiluted production of combustion in the first three zones in which the oxygen content is reduced to the minimum by providing means which permits only undiluted gases from entering the first three zones. However, should the temperature in the two or three zones be too great for direct application to the fodder, a minimum of dilution by cold air can be provided by the damper or slide in the bottom of each compartment.

The heated gases in all cases enter the various compartments through similar slides or openings in the upper part of each compartment connecting directly to the hot gas chamber 12, which extends the entire length of the conveyor.

Many users of artificial driers desire to have the grass or other material cut into short lengths. Sometimes this is done prior to drying and sometimes after drying, but in all cases it is effected by a separate machine or cutter mechanically independent of the drier itself.

I have provided cutters integral with the equipment, as follows: above and parallel to the stripping roll 54 I place a shaft 80 suitably supported in bearings and provided with a pulley or sprocket on the outboard end. This shaft is driven in a counterclockwise fashion and at such speed as will cause the cutting edge of the circular knives 82 to move faster than the periphery of the stripper wheel 54. These knives engage the sharp edge of a series of grooves turned in the stripper roll 54 so that the definite shearing or cutting thereof is produced. It will be obvious that the action of the teeth of both stripping and feeding rolls tends to straighten out the fibers in a direction parallel to the axis of the roll, so that when they reach the knives, these fibers will lie across the grooves and the knives. This puts them in a position facilitating cutting action.

At times it is desired to dry whole hay, in which case the knife shaft can be vertically elevated to a position entirely out of contact with the stripper roll 54, allowing the hay to pass thereunder without touching the knives.

When drying alfalfa or soy beans, the most difficult part of the process is to dry the woody stems. To facilitate this process, these stems should be crushed to allow the escape of the juice or sap. I provide a pair of crushing rolls for this purpose, as shown at the foot of the inclined apron or plate 68. The rolls 90 are suitably turned by pulleys on the outboard end of the shafts at equal speeds. The lower roll 90 is fixed in position, but upper roll 92 is adjustably held by two arms 94 at the extreme sides of the drying chamber. These arms are attached to a shaft mounted in bearings and operated by an external lever 95. By moving the arm to position A, the upper roll is elevated, as shown, and is ineffective for crushing purposes. When desired, it is placed in the position shown and any necessary amount of pressure exerted between the rolls by suitable clamp or screw means 96. It will be obvious that there is provided means for feeding whole hay without either cutting or crushing, or cutting it without crushing, or crushing it without cutting, or both cutting and crushing. It is obvious that when drying soy beans or the like there will be a large percentage of the material in the form of leaves and small stems. To run the entire material through the crushing rolls would not only crush the finer portions but would render difficult the crushing of the stems due to the cushioning effect of the fine material. I provide a pneumatic separator to remove the finer and lighter portions, as follows: a pipe 98, communicating with any suitable pressure blower is placed just ahead of the crushing rolls. A narrow slot in the plate 68 is provided with a suitable continuous connection to the pipe 98 the entire width of the plate. It will be obvious that a strong blast of air at this point will blow the major portion of the finer and lighter material out of the layer coming down to the crushing rolls, over the crushing rolls and on to the top of the layer of material on the belt or drier. While this separation will not be perfect, it will largely reduce the material passing between the crushing rolls and promote the more effective crushing of what remains. As shown in the drawings, the upper edge of the slot is elevated slightly above the lower edge in order to prevent small pieces from catching in the slot and preventing the sliding of the material over it.

Figure 8:
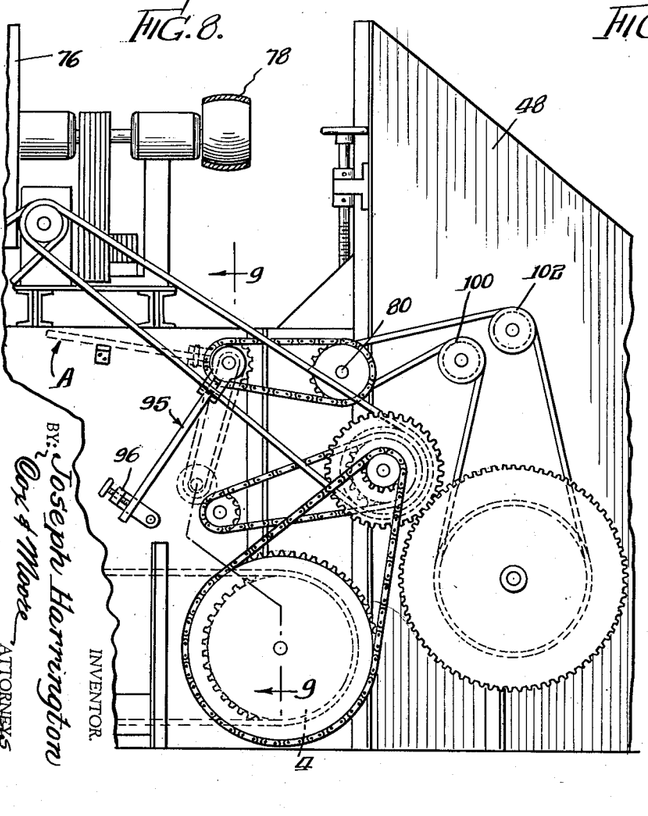
Figure 8 is a fragmentary side elevational view of a modified form of the device showing the driving means.
Figure 9:
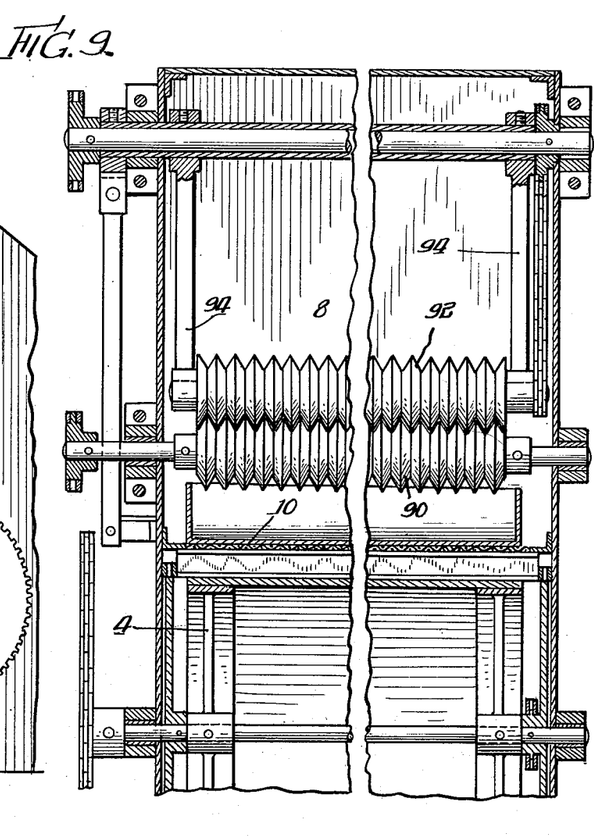
Figure 9 is a vertical cross sectional view taken on the line 9—9 of Figure 8.

In connection with the outside elevation shown in Figure 8 of the drawings, there are two idler pulleys 100 and 102 mounted on the side of the hopper. A belt or chain operating the cutter shaft will not be materially altered in length when the shaft is raised to the inactive position. The shaft and knives will continue to turn but will be out of contact and ineffective. Nothing more than the raising of the shaft by means of simple screws at either end will stop the cutting action, and this can be done or the knives can be put into service with the entire machine running. Similarly, the shaft is driven from the cutter shaft by an external belt and this same power is transferred to the upper crushing roll so that this roll can be taken out or put into service by simple adjustment of the lever without changing the belt, pulleys, or stopping the machine.

Figures 10, 11, 12:
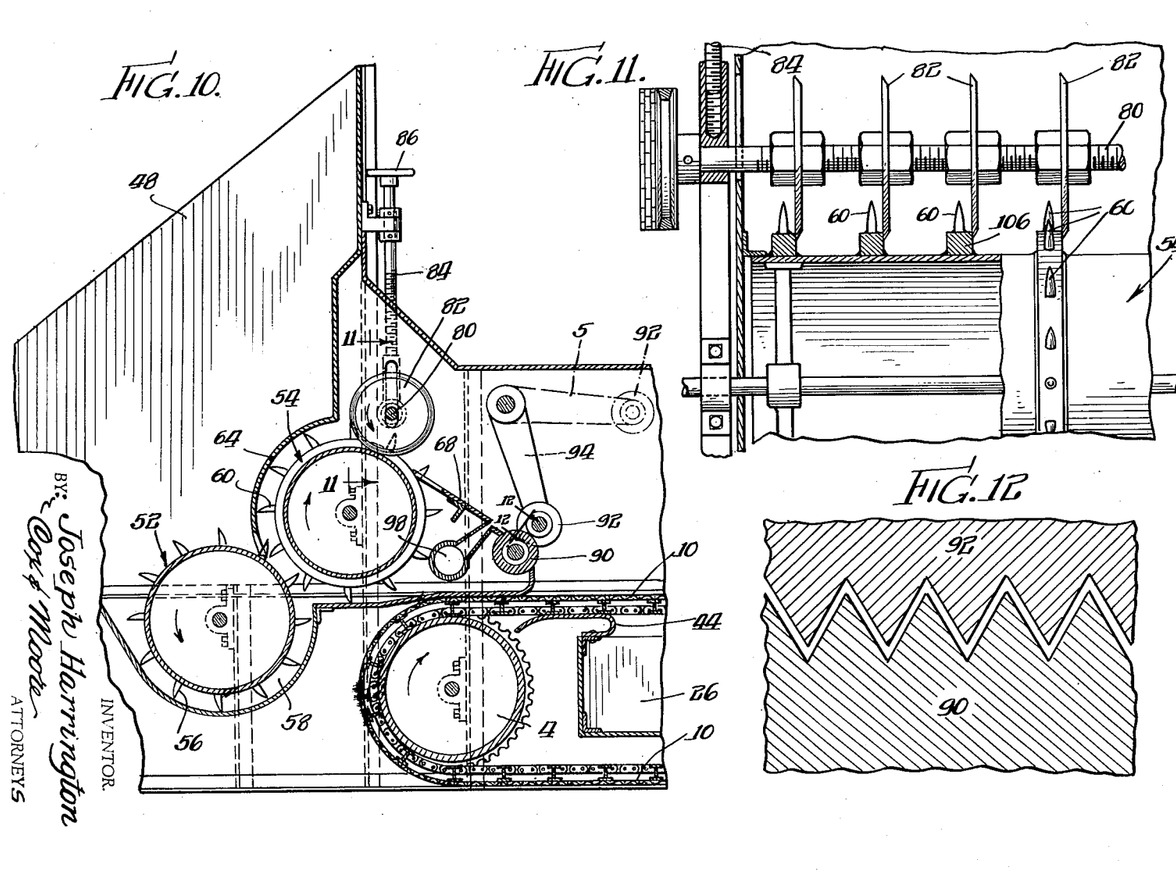
Figure 10 is a cross sectional view of the feed end of the modified form of device shown in Figure 8.
Figure 11 is a fragmentary detail view taken on the line 11—11 of Figure 10.
Figure 12 is a detail sectional view of the V-groove pressure roller taken on the line 12—12 of Figure 10.

It will be noted in Figure 11 that the cutting disks 82 make a wiping effect on studs 106, which carry the teeth 60.

The heat required for drying is provided by fuel oil and is burned in a steel encased combustion chamber of sixty-six cubic feet capacity. The oil burner is placed at the left and blows through the opening shown. The oil burner is permanently attached to the structure and takes its oil from a tank or drum placed alongside. The oil pump is a portion of the equipment furnished by the oil burner manufacturer. It is operated from and by the tractor that runs all the apparatus. It is a part of the oil burner. The suction hose is dropped in the barrel. It is the mechanical type of oil burner and oil is mechanically sprayed into the furnace. When the pump is operated by the tractor it serves to suck up the oil from an oil tank or reservoir and sprays it into the furnace.

On the operating shafts there is a pulley. The two shafts are belted together in a ratio found desirable. The oil pump might be put on one of the shafts and the pipe carried around.

The conveyor proper is enclosed on the two sides by a steel sideboard to prevent hay from falling overboard. The top is closed, forming an air-tight chamber which is under suction of the induced draft fan 76. The operation of this fan puts the entire chamber under suction so that the tendency is for air to flow into this chamber through the layer of drying material and its perforated support and through the underlying compartments which are connected to the chamber wherein the drying air is heated. The amount of such drying air entering the various compartments and passing through the overlying layer of material being dried is controlled by the position of the dampers 24 admitting air to the respective zones.

The temperature of the drying air in each zone is controlled by the amount of cold external air admitted to each compartment through the damper 40. By suitable adjustment of these two dampers both the volume and the temperature of the resultant drying air is controlled.

Fine copper mesh screens placed at a sharp angle must be put in each one of the hot air ducts to prevent the possibility of any spark being carried over into the compartment and igniting the dry material.

The conveyor itself may be formed of two flexible steel bands (shown clearly in Figure 6) as of substantially L-shaped cross section so as to make an endless belt. These will be perforated and the perforations will engage pegs on the periphery of the driving wheel shown at the bottom. Between these two bands I prefer to place a series of wires stretching transversely and attached flexibly to each one of the bands with links between them to maintain the spacing.

There will be inevitably a dropping of very fine dry material, such as hay seed and broken bits of leaves, through the principal supporting conveyor belt. To prevent these accumulating in the duct below and igniting, I have provided a very fine, perforate screen below them, or a series of dust catching screens that will blow the fine dust out to one side and continuously maintain clear the compartment below the conveyor.

It is also possible to make the conveyor itself out of a continuous band of very fine copper screen. There is no probability of overheating the copper screen, because it is exposed to the hot gas only a few seconds or possibly a minute and it then goes into a decreasing temperature and returns to the lower end of the machine in the open air, so that it reenters the hot zone perfectly cold. If this design is used, it is simple enough to construct the zone with an inclined bottom so that any very fine dust falling through can be blown out at intervals and thus prevent the possibility of any fire.

There is a possibility that one of these bands will get slightly ahead of the other, and it is desirable to prevent that possibility because if there is a belt five feet wide that is perfectly rigid, the moment one side gets one-half inch ahead of the other, it will buckle the structure. In order to prevent this, I provide a series of wires spaced as desired, possibly one-fourth of an inch, stretching between the nearest edges of these two side bands. They would have to be something that would not rust. They may be formed of a nickel chrome alloy steel that will run continuously red hot in air indefinitely.

In the present device, the green grass is carried across the high temperature first zone so rapidly that there will be no charring of the thin edges and yet a substantial advance in the dehydration. Then the second zone at a temperature of perhaps five hundred degrees must be of such length that it, in turn, does not result in charring the still drying material. The third zone will have a temperature cut down to two hundred fifty degrees and again must be so proportioned that excess drying of any portion will not be the result. The fourth zone will, perhaps, be at a temperature of one hundred degrees and will serve to trim up the last remaining traces of moisture and also to cool the product so that if it is immediately put into the barn it will not invite heating and spontaneous combustion. The last zone may be nothing but just warm air.

The oil burner, with a consideration for safety, is placed at the wet end of the conveyor, keeping all the fire away from the dry hay.

The green material will be thrown into the hopper. The back of the hopper will be a vertical wall spaced apart from the conveyor belt an amount determined by experience, the lower edge being adjustable in relation thereto. The nearest edge of the first zone can be one or even two feet back of this point so that the hot gases passing up through the burden of grass cannot possibly get under the gate and into the green grass hopper. It will necessarily emerge on the upper side of the partition and from there into the air.

If desired, the belt may be provided with a series of points or projections that will take hold of the material and carry it along, thus making positive the travel of the grass and hay upward along the conveyor belt. The tedders are preferably made of a series of steel rods welded into a shaft and turned up at the ends so that the prongs for carrying the hay will pass between the rods and not interfere therewith. The purpose of the tedders, of course, is to turn the material over as it dries and keep the material soft and loose.

In the specification and claims I have used the word "grasses" as describing freshly mown alfalfa, timothy, clover, grass, or any other suitable organic plant material adapted for stock feed or for human consumption.

Having thus described my invention, what I claim as new and desire to secure by Letters Patent is:

1. In a device of the class described, the combination of means forming an elongated chamber adapted to receive a foraminated conveyor, a hopper disposed at the inlet end of said chamber adapted to hold a quantity of freshly cut grass or other fodder crop, a drum equipped with a series of peripherally disposed teeth slanting in the direction of rotation of the drum, said drum being associated with said hopper so as to receive thereon the grasses disposed in the hopper, means for driving said drum, a guide wall concentrically disposed about a part of the periphery of said drum, and between which guide wall and the periphery of the drum said grasses are conveyed by the teeth during the rotation of the drum, a stripper drum having peripherally disposed teeth disposed oppositely to the direction of rotation of said second mentioned drum, there being means for rotating said second drum reversely to the direction of rotation of the first drum, and the teeth of said two drums being disposed in non-interfering relation, the teeth of said second drum being disposed to strip the grasses from the teeth of the first drum, a second guide wall, the edge of which is in grass stripping contact with the periphery of the first drum and the wall of which encloses concentrically the teeth of the second drum, and stripping means disposed at the inlet side of the conveyor chamber and arranged in stripping contact with the periphery of the second drum and to clear the teeth of the second drum whereby to strip the grasses from the second drum and to convey the same into the conveyor chamber and deposit the same in layer-like form upon the conveyor, and means for passing heated fluid medium through the grasses that are deposited in a layer on the conveyor.

2. In a device of the class described, the combination with means forming a chamber, a conveyor disposed in said chamber, a hopper disposed at the inlet end of said chamber adapted to receive a quantity of freshly cut grasses or similar fodder, a drum rotating in association with the hopper and adapted to receive the grasses on its periphery, said drum having teeth for withdrawing a layer of grasses from the hopper and carrying same in a predetermined path toward said chamber, and means disposed in the path of travel of the grasses for stripping said grasses from said drum and for maintaining said grasses in blanketlike form and for depositing same in said blanketlike form onto the conveyor in the chamber.

3. In a device of the class described in combination with a chamber, a conveyor in said chamber, a hopper associated with one end of said chamber and adapted to receive a quantity of freshly cut grasses or similar fodder, means disposed between the hopper and the chamber for continuously forming the grasses into a traveling blanket and for depositing the blanket of grasses on the conveyor, and means associated in the path of travel of said blanket for blowing the light, leafy particles out of said blanket in order to remove said light, leafy particles from the blanket in order to prevent them from interfering with a subsequent stem crushing operation.

4. In a device of the class described in combination with a chamber, a traveling conveyor therein, a hopper at the inlet end of the chamber adapted to receive a quantity of freshly cut grasses or similar fodder, means associated with the hopper and the inlet end of the chamber for continuously forming the grasses in the hopper into a traveling blanket and for conveying the blanket continuously into the chamber and for depositing the same upon the conveyor therein, means for cutting the grasses into predetermined lengths as they pass from the hopper into the chamber, and means for breaking or crushing the thicker portions of the grasses as the blanket travels from the hopper onto the conveyor.

5. In a device of the class described in combination with a chamber, a traveling conveyor therein, a hopper at the inlet end of the chamber adapted to receive a quantity of freshly cut grasses or similar fodder, means associated with the hopper and the inlet end of the chamber for continuously forming the grasses in the hopper into a traveling blanket and for conveying the blanket continuously into the chamber and for depositing the same upon the conveyor therein, means for cutting the grasses into predetermined lengths as they pass from the hopper into the chamber, means for breaking or crushing the thicker portions of the grasses as the blanket travels from the hopper onto the conveyor, and means for blowing the lighter, leafy particles of the grasses from the blanket before said grasses reach the crushing means and for projecting them onto the top of the crushed heavier portions of the grasses beyond the crushing means during the subsequent travel of the blanket in the furnace.

6. In a device of the class described, the combination with an elongated chamber, a foraminous conveyor disposed in said chamber and adapted to travel substantially throughout the length thereof, means forming a blanket of freshly cut grasses on said conveyor whereby the blanket is continuously formed and carried through the chamber, an outlet for said chamber, suction means at the outlet, and means disposed below the path of travel of the conveyor comprising a plurality of sequentially arranged compartments disposed in the path of travel of the conveyor, and means for supplying each of said compartments with a heated gaseous medium, there being means for controlling the temperature of the gaseous medium of each of said compartments, whereby as the blanket of grasses progresses through the chamber, heated gaseous medium of decreasing temperature will be drawn through the blanket of grasses to progressively dry the same, said suction means being the sole means for inducing the travel of the grasses through said blanket.

7. In a device of the class described in combination with an elongated chamber, a conveyor disposed therein and adapted to receive a blanket of grasses on the surface thereof for conveying the blanket of grasses continuously through the chamber and for disposing the same at the discharge end of said chamber, suction means causing a flow of heated gases to pass through the blanket of grasses as the blanket passes through said chamber, and a plurality of pivotally supported and independently movable sealing means disposed at the discharge end of the chamber, said sealing means being disposed transversely to the long axis of the conveyor and adapted individually to swing about the supporting pivot in accordance with the varying thickness of the blanket therebelow whereby completely to seal the space between the housing and the blanket on the conveyor so as to maintain the suction within the conveyor.

8. In a device of the class described, in combination with an elongated chamber, a conveyor in said chamber adapted to receive a blanket of freshly cut grasses or similar fodder, a hopper at the inlet end of the chamber adapted to receive a quantity of said grasses or similar fodder, means for withdrawing the grasses from the hopper and forming the same into a traveling blanket and for projecting the same onto the conveyor in the chamber, and means disposed in the path of travel of the blanket for breaking or crushing the thicker portions or stems of the blanket as they travel along, said means comprising two breaking or crushing rolls, the surfaces of which are formed of circular grooves and projections adapted to fit one into the other so that a stem lying axially will be broken or crushed into pieces equal in length to the spacing of the grooves.

9. In a device of the class described, in combination with an elongated chamber, a conveyor in said chamber adapted to receive a blanket of freshly cut grasses or similar fodder, a hopper at the inlet end of the chamber adapted to receive a quantity of said grasses or similar fodder, means for withdrawing the grasses from the hopper and forming the same into a traveling blanket and for projecting the same onto the conveyor in the chamber, and means disposed in the path of travel of the blanket for breaking or crushing the thicker portions or stems in the blanket as they travel along, said means comprising two breaking or crushing rolls, the cross sectional surface being formed of a series of spaced, substantially pyramidal projections on one and corresponding pyramidal depressions on the other, so that a stem lying in any direction will be broken or crushed at at least two places according to the size of said projections.

10. The herein described method of treating grasses in a drying chamber which comprises conveying a blanket of grasses to be dried along a predetermined path, blowing the lighter, leafy particles of the grass outwardly away from the blanket whereby to remove said leafy particles from the main blanket of grass, thereafter crushing the stemmy particles of the grass during the movement of said blanket while returning said light, leafy particles of grass onto the top of said travelling blanket of grass beyond the zone at which the crushing operation took place.

11. The herein described method of treating grasses in a drying chamber which comprises conveying a blanket of grasses to be dried along a predetermined path, blowing the lighter, leafy particles of the grass outwardly away from the blanket whereby to remove said leafy particles from the main blanket of grass, thereafter crushing the stemmy particles of the grass during the movement of said blanket while returning said light, leafy particles of grass onto the top of said travelling blanket of grass beyond the zone at which the crushing operation took place and thereafter projecting heated gases through the travelling blanket of grass.

12. In a device of the class described, in combination with an elongated chamber, means for conveying a blanket of grasses to be dried along a predetermined path in said chamber and means associated with the path of movement of the blanket of grasses for blowing the lighter, leafy particles of the grass away from the blanket so as to separate the said leafy particles from the main blanket of grasses, means associated with the path of travel of said blanket of grasses after said leafy particles have been removed therefrom for crushing the stemmy portions of the grasses of the blanket during the movement of said blanket, said leaf blowing means and said crushing means being disposed with respect to the path of travel of the blanket of grasses so that said leafy particles of grass separated from the blanket are returned to the upper portion of the blanket of grasses beyond the zone at which the crushing takes place, and means associated with the path of travel of the blanket of grasses and the leafy particles deposited on top thereof for blowing heated gases through said blanket from the bottom upwards whereby progressively to dry said grasses and the leafy particles.

JOSEPH HARRINGTON.